(12) United States Patent
Kamiya

(10) Patent No.: US 11,009,596 B2
(45) Date of Patent: May 18, 2021

(54) STORAGE MEDIUM LOCATION DETECTION SYSTEM AND PROGRAM

(71) Applicant: RFLOCUS INC., Tokyo (JP)

(72) Inventor: Hajime Kamiya, Tokyo (JP)

(73) Assignee: RFLOCUS INC., Tokyo (JP)

( * ) Notice: Subject to any disclaimer, the term of this patent is extended or adjusted under 35 U.S.C. 154(b) by 165 days.

(21) Appl. No.: 16/376,522

(22) Filed: Apr. 5, 2019

(65) Prior Publication Data

US 2019/0235065 A1 Aug. 1, 2019

Related U.S. Application Data

(63) Continuation of application No. 15/534,364, filed as application No. PCT/JP2016/077996 on Sep. 23, 2016, now Pat. No. 10,295,661.

(30) Foreign Application Priority Data

Oct. 16, 2015 (JP) .................................. 2015-216099

(51) Int. Cl.
*G01S 13/32* (2006.01)
*G01S 13/46* (2006.01)
(Continued)

(52) U.S. Cl.
CPC .............. *G01S 13/32* (2013.01); *G01S 13/46* (2013.01); *G01S 13/84* (2013.01); *G01S 13/878* (2013.01);
(Continued)

(58) Field of Classification Search
CPC ........ G01S 13/32; G01S 13/46; G01S 13/878; G01S 13/84; G01S 13/346; G01S 2013/466; G06K 7/10
See application file for complete search history.

(56) References Cited

U.S. PATENT DOCUMENTS

| | | |
|---|---|---|
| 4,041,490 A | 8/1977 | Watt |
| 4,109,247 A | 8/1978 | Kaplan |
| (Continued) | | |

FOREIGN PATENT DOCUMENTS

| | | |
|---|---|---|
| CN | 104915618 A1 | 9/2015 |
| EP | 2779020 A2 | 9/2014 |
| (Continued) | | |

*Primary Examiner* — Bernarr E Gregory
(74) *Attorney, Agent, or Firm* — Muncy, Geissler, Olds and Lowe, P.C.

(57) ABSTRACT

A storage medium-compatible communications unit, a phase detection unit, a parameter acquisition section and a location detection section are provided. The storage medium-compatible communications unit communicates with a storage medium by wireless using electromagnetic waves at a predetermined frequency. The phase detection unit detects phases of signals received from the storage medium. The parameter acquisition section acquires a distance detection parameter to be used in detecting a storage medium distance from a first position of an antenna to the storage medium. The first position is a position in a range of positions of the antenna from which the distance to the storage medium is shortest. The distance detection parameter is a value set in accordance with a positional relationship between the first position and a second position. The second position is a position of the antenna in the range of positions of the antenna that is different from the first position. The location detection section detects the storage medium distance, using a first phase detected by the phase detection unit at the first position, a second phase detected by the phase detection unit at the second position, and the distance detection parameter acquired by the parameter acquisition section. The location detection section identifies the first position at a time at which a trend of changes of phase detected by the phase detection unit in association with movement of the antenna reverses.

33 Claims, 8 Drawing Sheets

(51) Int. Cl.
*G01S 13/87* (2006.01)
*G01S 13/84* (2006.01)
*G06K 7/10* (2006.01)
*G01S 13/34* (2006.01)
*G01S 13/00* (2006.01)

(52) U.S. Cl.
CPC .............. *G06K 7/10* (2013.01); *G01S 13/346* (2013.01); *G01S 2013/466* (2013.01)

(56) References Cited

U.S. PATENT DOCUMENTS

| | | | |
|---|---|---|---|
| 4,315,260 | A | 2/1982 | Kupfer |
| 4,728,955 | A | 3/1988 | Hane |
| 4,804,961 | A | 2/1989 | Hane |
| 5,227,803 | A | 7/1993 | O'Connor et al. |
| 5,233,353 | A | 8/1993 | Guena et al. |
| 6,072,421 | A | 6/2000 | Fukae et al. |
| 6,868,073 | B1 | 3/2005 | Carrender |
| 7,119,738 | B2 | 10/2006 | Bridgelall et al. |
| 8,094,061 | B2 | 1/2012 | Aoki |
| 8,159,367 | B2 | 4/2012 | Hofer et al. |
| 8,188,908 | B2 | 5/2012 | Landt |
| 9,460,327 | B2 | 10/2016 | Kamiya |
| 2005/0190098 | A1 | 9/2005 | Bridgelall et al. |
| 2006/0044147 | A1 | 3/2006 | Knox et al. |
| 2007/0241904 | A1* | 10/2007 | Ozaki .................. G01S 13/84 340/572.1 |
| 2008/0143584 | A1* | 6/2008 | Shoarinejad ........... G01S 13/84 342/127 |
| 2009/0091428 | A1 | 4/2009 | Tuttle |
| 2009/0091454 | A1 | 4/2009 | Tuttle |
| 2009/0303006 | A1 | 12/2009 | Eggers et al. |
| 2010/0039228 | A1* | 2/2010 | Sadr .................. G06K 7/10366 340/10.1 |
| 2011/0012713 | A1* | 1/2011 | Wilkinson ......... G06K 7/10297 340/10.3 |
| 2011/0187600 | A1 | 8/2011 | Landt |
| 2018/0181887 | A1 | 6/2018 | Chen et al. |

FOREIGN PATENT DOCUMENTS

| | | | | |
|---|---|---|---|---|
| JP | 2006-270561 A | * | 10/2006 | ............. H04N 5/232 |
| JP | 2007-005969 | | 1/2007 | |
| JP | 2008-102102 | | 5/2008 | |
| JP | 2010-156633 | | 7/2010 | |
| JP | 2011-085391 | | 4/2011 | |
| JP | 2013-205168 | | 10/2013 | |
| WO | WO 2005/091013 A1 | | 9/2005 | |

* cited by examiner

STORAGE MEDIUM LOCATION DETECTION SYSTEM AND PROGRAM

CROSS REFERENCE TO RELATED APPLICATIONS

This application is a Continuation of co-pending application Ser. No. 15/534,364, filed on Jun. 8, 2017, now U.S. Pat. No. 10,295,661, for which priority is claimed under 35 U.S.C. § 120, which is a 371 of international application PCT/JP2016/077996, and this application claims priority of Application No. 2015-216099 filed in Japan on Oct. 16, 2015 under 35 U.S.C. § 119, the entire contents of all of which are hereby incorporated by reference.

TECHNICAL FIELD

The present invention relates to a storage medium location detection system and program. This application claims priority from Japanese Patent Application No. 2015-216099, filed Oct. 16, 2015, the disclosure of which is incorporated by reference herein.

BACKGROUND ART

A technology is known that, with a view to detecting the location of a radio frequency identification (RFID) tag, utilizes phases of plural tag signals that are obtained in accordance with a user moving an RFID tag-compatible reader and determines a bearing on which the RFID tag is disposed (for example, see Patent Document 1).

However, in the technology described above, although the bearing on which the RFID tag is disposed can be detected, a distance to the RFID tag is not detected. A technology is known (for example, see Patent Document 2) that detects a distance to an RFID tag as described below. A reader transmits plural signals to an RFID tag using plural signals with different fundamental frequencies. In response to these signal transmissions, the RFID tag applies backscatter modulation to the plural signals. The reader determines phases of the plural backscatter-modulated signals received from the RFID tag, and determines a rate of change of the phases of the backscatter modulation signals with respect to a rate of change of the fundamental frequencies of the transmitted signals. The reader then utilizes information on the determined rate of change of phase to calculate the distance to the RFID tag.

Patent Document 1: European Patent Application, Publication No. 2779020

Patent Document 2: U.S. Pat. No. 7,119,738

DISCLOSURE OF THE INVENTION

Problems to be Solved by the Invention

However, in the technology recited in Patent Document 2, in order to obtain high accuracy in detection of distances, sufficient frequency differences between the plural signals that are transmitted and received between the reader and the RFID tag must be assured. On the other hand, the range of frequencies assigned for communications with an RFID tag is limited. As a result, in practice it is difficult to assure sufficient frequency differences between the plural signals transmitted and received between the reader and the RFID tag, and it is difficult to improve distance detection accuracy. A further technique is known for detecting distance on the basis of the strengths of signals that a reader receives from an RFID tag. However, distances detected by this technique may not be considered to be accurate enough.

The present invention has been made in consideration of the circumstances described above and an object of the present invention is to provide a storage medium location detection system and program that may detect a distance to a storage medium with high accuracy.

Means for Solving the Problems

One aspect of the present invention for solving the problem described above is a storage medium location detection system including: a storage medium-compatible communications unit that communicates with a storage medium by wireless using electromagnetic waves at a predetermined frequency; a phase detection unit that detects phases of signals received from the storage medium; a parameter acquisition section that acquires a distance detection parameter to be used in detecting a storage medium distance from a first position of an antenna to the storage medium, the first position being a position in a range of positions of the antenna from which the distance to the storage medium is shortest, the distance detection parameter being a predetermined value set in accordance with a positional relationship between the first position and a second position, and the second position being a position of the antenna in the range of positions of the antenna that is different from the first position;

and a location detection section that detects the storage medium distance, the location detection section using a first phase detected by the phase detection unit at the first position, a second phase detected by the phase detection unit at the second position, and the distance detection parameter acquired by the parameter acquisition section, wherein the location detection section identifies the first position at a time at which a trend of changes of phase detected by the phase detection unit in association with movement of the antenna reverses.

Effects of the Invention

As described above, according to the present invention, an effect is provided in that a storage medium location detection system and program that may detect a distance to a storage medium with high accuracy may be provided.

PREFERRED MODE FOR CARRYING OUT THE INVENTION

Below, a storage medium location detection system according to an embodiment of the present invention is described with reference to the attached drawings. The storage medium that is the object of location detection in the present embodiment is a radio frequency identification (RFID) tag. In the following descriptions, the RFID tag may be referred to simply as "the tag".

Figure 1:
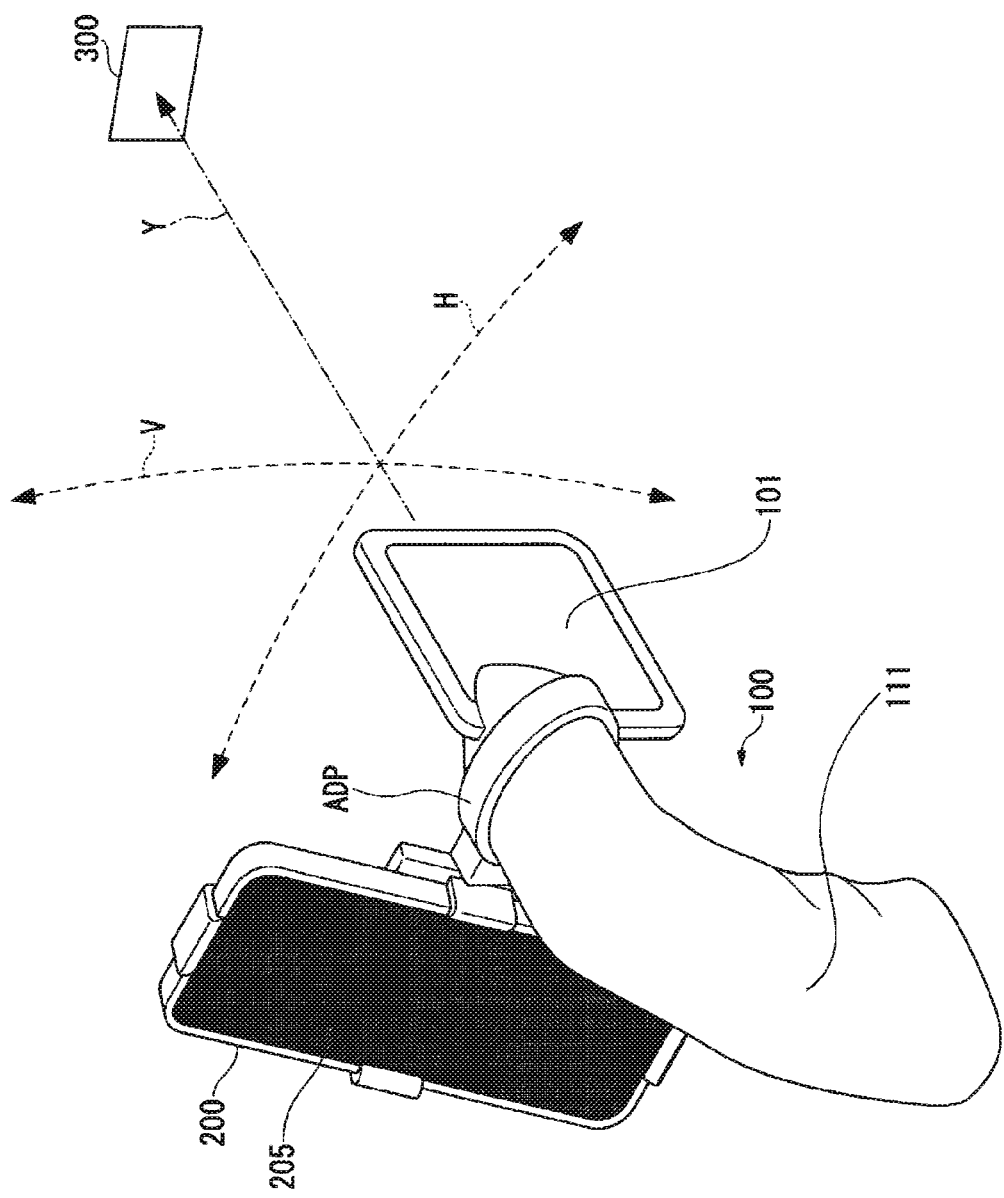
FIG. 1 is a diagram illustrating an example of the exterior of a tag location detection system according to a present embodiment.

FIG. 1 shows an example of the exterior of the tag location detection system according to the present embodiment. The tag location detection system in FIG. 1 is equipped with a tag reader 100 and a portable terminal device 200. The tag reader 100 communicates by wireless with an RFID tag 300 using electromagnetic waves. In the present embodiment, the tag reader 100 and RFID tag 300 communicate using a predetermined frequency range in the ultra-high frequency (UHF) band. Note, however, that a frequency range that the tag reader 100 and RFID tag 300 use to communicate in the present embodiment is not particularly limited. The tag reader 100 is equipped with a grip portion 111 and an antenna 101 that is provided at a distal end portion of the grip portion 111. The direction indicated by arrow Y in FIG. 1 is, for example, a direction in which directionality of the antenna 101 is strongest (below referred to as "the antenna orientation direction"). When a user is using the tag reader 100, the user should hold the grip portion 111 in one hand and point the antenna 101 toward the RFID tag 300 that is an object of communication.

The portable terminal device 200 utilizes information on phases of signals that the tag reader 100 receives from the RFID tag 300 to detect the location of the RFID tag 300 (a tag location). In the present embodiment, the portable terminal device 200 may detect a distance to the RFID tag and a bearing of the RFID tag to serve as the tag location. To output the detected tag location, the portable terminal device 200 displays a tag location screen representing the tag location on a display unit 205.

The portable terminal device 200 is fixed to the tag reader 100 by an adapter ADP. In the state in which the portable terminal device 200 is fixed by the adapter ADP, the portable terminal device 200 is disposed such that a screen of the display unit 205 faces toward the user holding the tag reader 100. Therefore, the user may see the screen of the portable terminal device 200 fixed to the tag reader 100 at all times while holding the tag reader 100. The portable terminal device 200 according to the present embodiment may be a dedicated terminal or may be, for example, a general-purpose terminal such as a smartphone or the like on which an application is installed that performs functions relating to tag location detection and display of a detected tag location.

The RFID tag 300 according to the present embodiment is used in, for example, administration of products displayed in a store. The RFID tags 300 are mounted to each of the products displayed in the store. For example, when a product is being sold, a tag reader at a register may conduct price processing and sale results administration by retrieving information in product codes (for example, a JAN code, a price and the like) stored in the RFID tag mounted at the product that a customer wishes to buy. In this environment, there may be cases in which a specific product should be sought out among the products displayed in the store. In this situation, if the location of the tag mounted to that product can be identified, the product being sought can be found quickly and precisely without reliance on the memory of a store employee or the like. It is desirable if the accuracy of the detected location is as high as possible. Accordingly, in the present embodiment, the tag location detection system including the tag reader 100 and portable terminal device 200 as illustrated in FIG. 1 is configured so as to detect a tag location with high accuracy. A configuration for this purpose is described below.

When a tag location is being detected with the tag location detection system according to the present embodiment, a user holds the tag reader 100 to which the portable terminal device 200 is fixed, points the tag reader 100 in a direction in which the RFID tag 300 being sought is likely to be located, and moves the tag reader 100 so as to swing the antenna orientation direction represented by arrow Y in FIG. 1 in an arbitrary direction up or down and left or right. This movement of the tag reader 100 may be resolved into a movement component in a horizontal direction H and a movement component in a vertical direction V, which are shown in FIG. 1. If the tag reader 100 communicates with the RFID tag 300 being sought in accordance with the state in which the tag reader 100 is being moved as described above, the tag location is detected by the portable terminal device 200 and the detected location is displayed on the display unit 205 of the portable terminal device 200.

Figure 2:
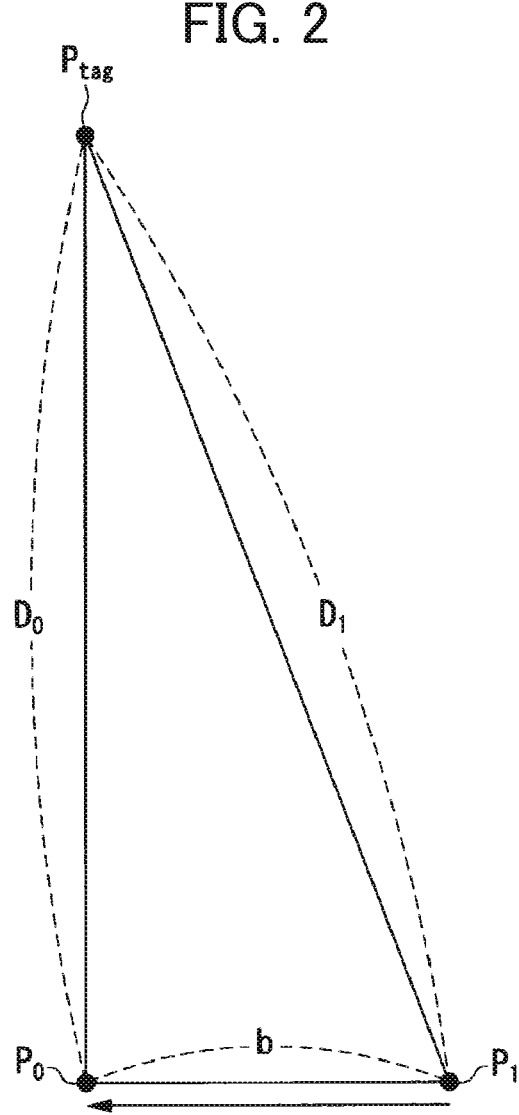
FIG. 2 is a diagram depicting an example of a method for detection of the location of an RFID tag according to the present embodiment.

Referring to FIG. 2, an example of a method for detection of the tag location in the present embodiment is described. A case in which the antenna 101 of the tag reader 100 is moved in a straight line in a horizontal direction during tag location detection is given as an example. In FIG. 2, position $P_{tag}$ represents a position of the RFID tag 300 in a horizontal direction (a plan view direction). A position $P_0$ and a position $P_1$ are respective, mutually different positions of the antenna 101 (antenna positions) that are attained during the linear movement of the tag reader 100 in the horizontal direction. A case in which position $P_1$ corresponds to the start of the movement of the tag reader 100 and position $P_0$ is attained at a later time in the movement of the tag reader 100 is given as an example. In this case, position $P_0$ is the antenna position in the movement path of the antenna 101 at which the distance from the antenna 101 to the RFID tag 300 is shortest.

As illustrated in FIG. 2, a triangle is formed by position $P_{tag}$, position $P_0$ and position $P_1$. In the triangle whose vertices are at position $P_{tag}$, position $P_0$ and position $P_1$, the angle of the vertex at position $P_0$ is 90°. Thus, the triangle formed by the vertices at position $P_{tag}$, position $P_0$ and position $P_1$ is a right-angled triangle.

A round-trip distance $2D_0$ between position $P_{tag}$ and position $P_0$ shown in FIG. 2 is expressed by the following Equation 1.

$$2D_0 = n\lambda + \frac{\lambda \Phi_0}{2\pi} \qquad \text{(Formula 1)}$$

In Equation 1, the symbol λ, represents the wavelength of a carrier wave of a first frequency that is transmitted and received between the tag reader 100 and the RFID tag 300. The symbol n represents a number of cycles of the carrier wave. The symbol $\Phi_0$ represents a phase of signals received from the RFID tag 300 at position $P_0$, which phase is detected by the tag reader 100.

A round-trip distance $2D_1$ between position $P_{tag}$ and position $P_1$ is expressed by the following Equation 2.

$$2D_1 = n\lambda + \frac{\lambda \Phi_0}{2\pi} + \frac{\lambda \Delta \Phi}{2\pi} \qquad \text{(Formula 2)}$$

A phase of signals received from the RFID tag 300 at position $P_1$ that is detected by the tag reader 100 is φ1. In Equation 2, the symbol $\Delta\Phi$ represents a difference (a phase difference) between the phases $\Phi_1$ and $\Phi_0$. The phase difference $\Delta\Phi$ is expressed by the following Equation 3.

$$\Delta\Phi = \Phi_1 - \Phi_0 \qquad \text{(Formula 3)}$$

Because the triangle whose vertices are at position $P_{tag}$, position $P_0$ and position $P_1$ is a right-angled triangle, the tag distance $D_0$, the distance $D_1$ and a distance b satisfy the relationship in the following Equation 4.

$$D_0^2 + b^2 = D_1^2 \qquad \text{(Formula 4)}$$

Therefore, based on Equation 1, Equation 2 and Equation 4, the tag distance $D_0$ can be expressed by the following Equation 5. The tag distance $D_0$ is the distance to the RFID tag 300 that the tag location detection system according to the present embodiment is intended to detect as the location of the RFID tag 300.

$$D_0 = \frac{2\pi}{\lambda \Delta \Phi} b^2 - \frac{\lambda \Delta \Phi}{8\pi} \qquad \text{(Formula 5)}$$

The tag distance $D_0$ can be calculated from Equation 5 even if $\Delta\Phi$ is greater than $2\pi$. Therefore, there is no limitation on the length of the distance b in a calculation of the tag distance $D_0$ according to Equation 5.

In Equation 5, the wavelength λ, is already known. Therefore, in order to calculate the tag distance $D_0$ from the antenna 101 to the RFID tag 300, it is necessary to acquire the phase difference $\Delta\Phi$ and the distance b.

As shown by Equation 3, the phase difference $\Delta\Phi$ in Equation 5 is the difference between phase $\Phi_0$ and phase $\Phi_1$. Therefore, to acquire the phase difference $\Delta\Phi$, it is sufficient to acquire the phase $\Phi_0$ detected at position $P_0$ and the phase $\Phi_1$ detected at position $P_1$. The present embodiment is configured to be capable of detecting the phases of signals that the tag reader 100 receives from the RFID tag. To find the tag distance $D_0$ with Equation 5, it is also necessary to identify the position $P_0$, at which the distance to the RFID tag 300 is shortest, in a movement range (position range) of the antenna 101 when the movement of the antenna 101 has started from position $P_1$.

A number of modes for acquisition of the distance b can be considered. Here, two representative examples of modes of acquisition of the distance b are mentioned. In one mode, a value of a movement speed of the tag reader 100 (a reader movement speed) v for calculating the distance b, which is a value fixed beforehand, is stored in the portable terminal device 200 in advance. When a tag distance $D_0$ is being calculated with Equation 5, the distance b is calculated by multiplying a movement duration t by the stored reader movement speed v. When a user holds the tag reader 100 in their hand and moves the tag reader 100 in order to detect a tag location, the movement speed of the antenna 101 is generally consistent. Therefore, a single value may be set as the reader movement speed v on the basis of a general movement speed of the antenna 101 when the tag reader 100 is held by hand and moved, and this value may be stored in the portable terminal device 200 in advance. In the other mode, the portable terminal device 200 is equipped with an acceleration sensor. The portable terminal device 200 uses detection outputs from the acceleration sensor to calculate the distance moved from position $P_1$ to position $P_0$ in a movement of the tag reader 100. For example, speeds during the movement from position $P_1$ to position $P_0$ are calculated on the basis of detection outputs from the acceleration sensor. Hence, the movement distance from position $P_1$ to position $P_0$ can be calculated from durations and speeds taken in the movement from position $P_1$ to position $P_0$. The portable terminal device 200 may acquire this calculated movement distance to serve as the distance b.

Figure 3:
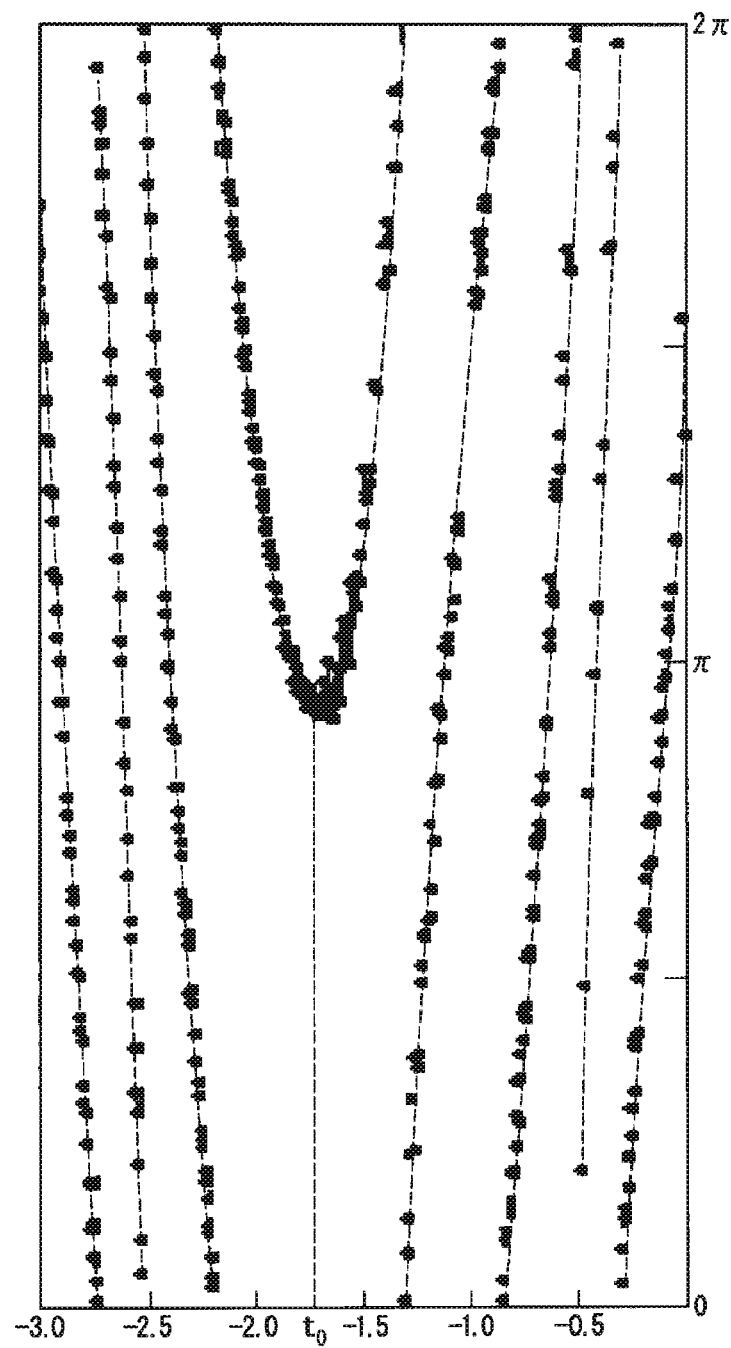
FIG. 3 is a diagram illustrating an example of changes with the passage of time of phases detected by a tag reader according to the present embodiment.

In the present embodiment, position $P_0$ may be identified by the portable terminal device 200 as follows. FIG. 3 shows an example of changes with the passage of time of phases of a tag disposed at $P_{tag}$ (1 m) that are detected by the tag reader 100, in a case in which the tag reader 100 is moved a distance b (1.25 m) in the horizontal direction from position $P_1$. The horizontal axis in FIG. 3 represents time and the vertical axis represents phase angle. In this case, in a period of movement lasting approximately 1.25 s, from −3.0 s when the movement of the antenna 101 is started to around −1.75 s, the distance from the antenna 101 to the RFID tag 300 is longer than the shortest distance thereof, and the phase repeatedly changes through a negative trend in the range from $2\pi$ to 0. The phase difference $\Delta\Phi$ from −3.0 s to approximately −1.75 s is about $7\pi$. Subsequently, when the antenna 101 is moved further and the distance to the RFID tag 300 departs from the minimum distance, the phase reverses from the falling trend to a rising trend at time t0. That is, a phenomenon occurs in which the trend of changes of phase (more specifically, the trend of trend lines corresponding to changes in phase with the passage of time) is reversed. This phenomenon is caused by the antenna 101 moving toward the RFID tag 300 and the tag distance $D_0$ decreasing up to time t0, and then the distance $D_0$ increasing after time t0, as can be understood from Equation 1 above. Thus, the position of the antenna 101 at time t0 when this phenomenon occurs corresponds to position $P_0$ shown in FIG. 2. Thereafter, as the antenna 101 continues to move in the same direction, the antenna 101 moves away from the RFID tag 300 again, during which the phase repeatedly changes through a positive trend in the range from 0 to $2\pi$. Accordingly, the portable terminal device 200 monitors the phases of received signals detected by the tag reader 100 in accordance with a movement of the antenna 101, and determines a time at which the trend of changes of phase reverses. Position $P_0$ can be identified by the determination of this time.

From the above description, it can be seen that changes in phase follow a negative trend in a state in which a movement direction of the antenna 101 is toward the RFID tag 300 and changes in phase follow a positive trend in a state in which a movement direction of the antenna 101 is away from the RFID tag 300. Thus, it is possible to identify from a trend of changes of phase with the passage of time whether the antenna 101 and the RFID tag 303 are moving closer together or moving apart.

Because there are multiple electromagnetic wave paths between the antenna 101 and the RFID tag 300, waves may overlap (multipaths). As a result, locations at which data cannot be retrieved from the RFID tag 300 (null points) may occur and there may be temporary vibrations in phase data (noise may be generated). However, many values of the phase difference ΔΦ may be acquired in the process of movement of the antenna 101, and multipath effects in an ordinary indoor environment may be eliminated by calculating the trend lines using the least squares method or the like.

Position $P_0$ is identified, at which the distance from the antenna 101 to the RFID tag 300 is a shortest distance within the movement range of the antenna 101, indicating that the antenna orientation direction represented by arrow Y in FIG. 1 is pointing directly toward the RFID tag 300. That is, the bearing on which the RFID tag 300 is disposed may be identified by identifying position $P_0$. Accordingly, the portable terminal device 200 is provided with a sensor (a magnetic sensor, an acceleration sensor, an angular velocity sensor or the like) that detects directions (azimuth angles and elevation angles). The portable terminal device 200 acquires the direction that this sensor detects at the time t0 at which position $P_0$ is identified. Thus, the portable terminal device 200 may detect the bearing on which the RFID tag 300 is disposed in the horizontal direction (the plan view direction).

The portable terminal device 200 according to the present embodiment further identifies a position $P_0$ in the vertical direction in accordance with a movement of the antenna 101 of the tag reader 100 in the vertical direction (a side view direction) by the same method as the method described with FIG. 2 and FIG. 3. Thus, the portable terminal device 200 according to the present embodiment may both find the bearing and distance of a tag location in the horizontal direction and find a bearing and distance of the tag location in the vertical direction.

In the present embodiment, with the detection method described above, the tag distance may be detected with high accuracy in association with both a horizontal bearing and a vertical bearing even though signals based on a single frequency are being transmitted and received between the tag reader 100 and the RFID tag 300. In the process of calculating the distance, the bearing on which the RFID tag 300 is disposed may also be detected with high accuracy. That is, in the present embodiment, a tag location may be detected with high accuracy within the range of a frequency band assigned to communications between the RFID tag 300 and the tag reader 100.

The actual location of the RFID tag 300 by reference to the antenna 101 is located in a three-dimensional space. Therefore, it is difficult to precisely identify the bearing of the RFID tag 300 according to the actual location of the RFID tag 300 within the three-dimensional space from only one of detection results for the bearing of the RFID tag 300 in the horizontal direction and detection results for the bearing of the RFID tag 300 in the vertical direction. Correspondingly, it is difficult to appropriately indicate the actual location of the RFID tag 300 in the three-dimensional space from only one of detection results for the distance of the RFID tag 300 in the horizontal direction and detection results for the distance of the RFID tag 300 in the vertical direction.

Therefore, in the present embodiment the tag location located in the three-dimensional space is identified by combining the detection results of the tag location in the horizontal direction with the detection results of the tag location in the vertical direction. To be specific, in the process of movement of the antenna 101, the portable terminal device 200 detects the bearing of the RFID tag 300 from a direction in a plane in which a position $P_0$ is identified first, which is the horizontal direction or the vertical direction. Then, at a time at which a position $P_0$ is identified for a direction in the other plane, which is orthogonal to the one plane in which the bearing of the RFID tag 300 was detected first, the portable terminal 200 detects the distance and bearing from the direction in the other plane. The distance and bearing that are ultimately detected in this manner accurately express the distance and bearing according to the actual location of the RFID tag 300 in the three-dimensional space.

Now, an alternative example of a method for detection of the tag location according to the present embodiment is described with reference to FIG. 4. First, a case in which the tag location (distance and bearing) is detected in the horizontal direction is described. In the above example of a method for detection of the tag location according to FIG. 2, the movement of the antenna 101 is simplified to a straight line. However, when a user is detecting a tag location, a movement path of the antenna 101 when the tag reader 100 is held in a user's hand and moved in order to seek the location of the RFID tag 300 may be considered to form, for example, a circular arc centered on the user's elbow.

If the movement path of the antenna 101 is treated as forming a circular arc centered on the elbow of the user as described above, then as shown in FIG. 4, position $P_0$ and position $P_1$ of the horizontal direction are positions on a line of circumference with a center O, corresponding to the location of the elbow, and a radius r, corresponding to a forearm length from the elbow. As shown in FIG. 4, a line from position $P_1$ which is orthogonal to a radius line r linking position $P_0$ with the center O is denoted "c", an end point of line c at the radius line r linking position $P_0$ with center O is denoted "A", and a line from position $P_0$ to point A is denoted "a". A central angle formed between the radius that passes through position $P_0$ on the circumference and a radius that passes through position $P_1$ on the circumference (that is, a central angle when position $P_0$ and position $P_1$ are the two ends of an arc) is denoted "θ". In this situation, the length of line c is expressed by the following Equation 6.

$c = r \sin \theta$ (Formula 6)

Hence, the tag distance $D_0$ and distance $D_1$ satisfy the relationship expressed by the following Equation 7.

$(D_0+a)^2 + (r \sin \theta)^2 = D_1^2$ (Formula 7)

The length of line a may be expressed by the following Equation 8.

$a = r - r \cos \theta = r(1 - \cos \theta)$ (Formula 8)

Therefore, after the phase difference ΔΦ is found, the tag distance $D_0$ in the horizontal direction can be calculated by the following Equation 9 based on Equation 7 and Equation 8.

$$D_0 = \frac{-ar + \frac{1}{2}\left(\frac{\lambda \Delta \Phi}{4\pi}\right)^2}{a - \frac{\lambda \Delta \Phi}{4\pi}}$$ (Formula 9)

Figure 4:
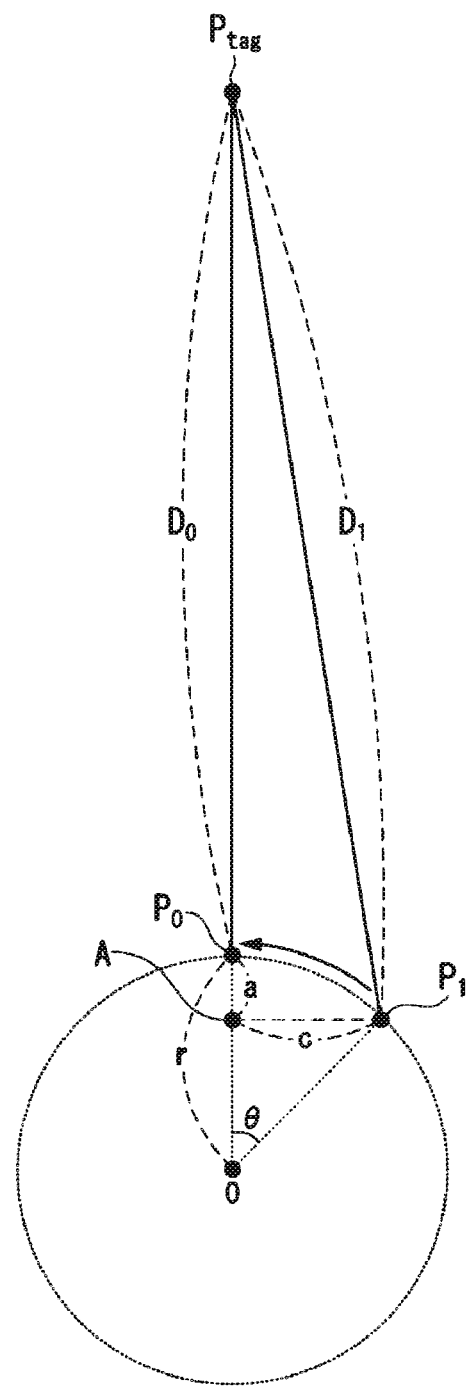
FIG. 4 is a diagram depicting an alternative example of a method for detection of the location of an RFID tag according to the present embodiment.

A method for identifying the position $P_0$ in the case of the example in FIG. 4 may be similar to the method described with FIG. 3. Accordingly, in the case of the example in FIG. 4, the direction detected by the sensor at the time at which position $P_0$ is identified on the basis of changes of phase is acquired, and the acquired direction may be used as a detection result for the bearing of the RFID tag 300 in the horizontal direction.

According to Equation 9, the tag distance $D_0$ can be found if values of the radius r and central angle θ are acquired. As mentioned above, the radius r corresponds to the forearm length of the user holding the tag reader 100. Although the forearm lengths of users differ between different users, the forearm lengths of humans fall within a certain range; individual differences are in a range from a few cm to 10 cm or so. Therefore, a value may be fixed for the radius r on the basis of an average human forearm length and stored in advance in the portable terminal device 200. Hence, in a calculation of the tag distance $D_0$ based on Equation 9, it is sufficient for the portable terminal device 200 to acquire the stored value of the radius r. Alternatively, the forearm length of the user operating the tag reader 100 may be measured and the measured length value may be stored in the portable terminal device 200 by user operations to be the radius r.

In order to acquire the central angle θ, for example, a direction sensor device is provided in the portable terminal device 200. In association with a movement of the antenna 101 in the horizontal direction, a difference is calculated between an angle detected by this sensor device at the time at which the movement in the horizontal direction starts from position $P_1$ and an angle detected by the sensor device at the time at which position $P_0$ is identified. The portable terminal device 200 may acquire the difference that is found in this manner to be the central angle θ.

As described above, the portable terminal device 200 may acquire the radius r and a central angle θ corresponding to a movement of the antenna 101 in the horizontal direction and use Equation 9 to calculate the tag distance $D_0$ for the horizontal direction. Similarly, the portable terminal device 200 may acquire the radius r and a central angle θ corresponding to a movement of the antenna 101 in the vertical direction and use Equation 9 to calculate the tag distance $D_0$ for the vertical direction. In this case too, a bearing of the RFID tag 300 located in a three-dimensional space may be detected with high accuracy by combining detection results of the bearing of the RFID tag 300 in the horizontal direction with detection results of the bearing of the RFID tag 300 in the vertical direction. Furthermore, the tag distance located in the three-dimensional space may be detected with high accuracy by calculating the distance in accordance with the bearing that is detected in this manner.

Figure 5:
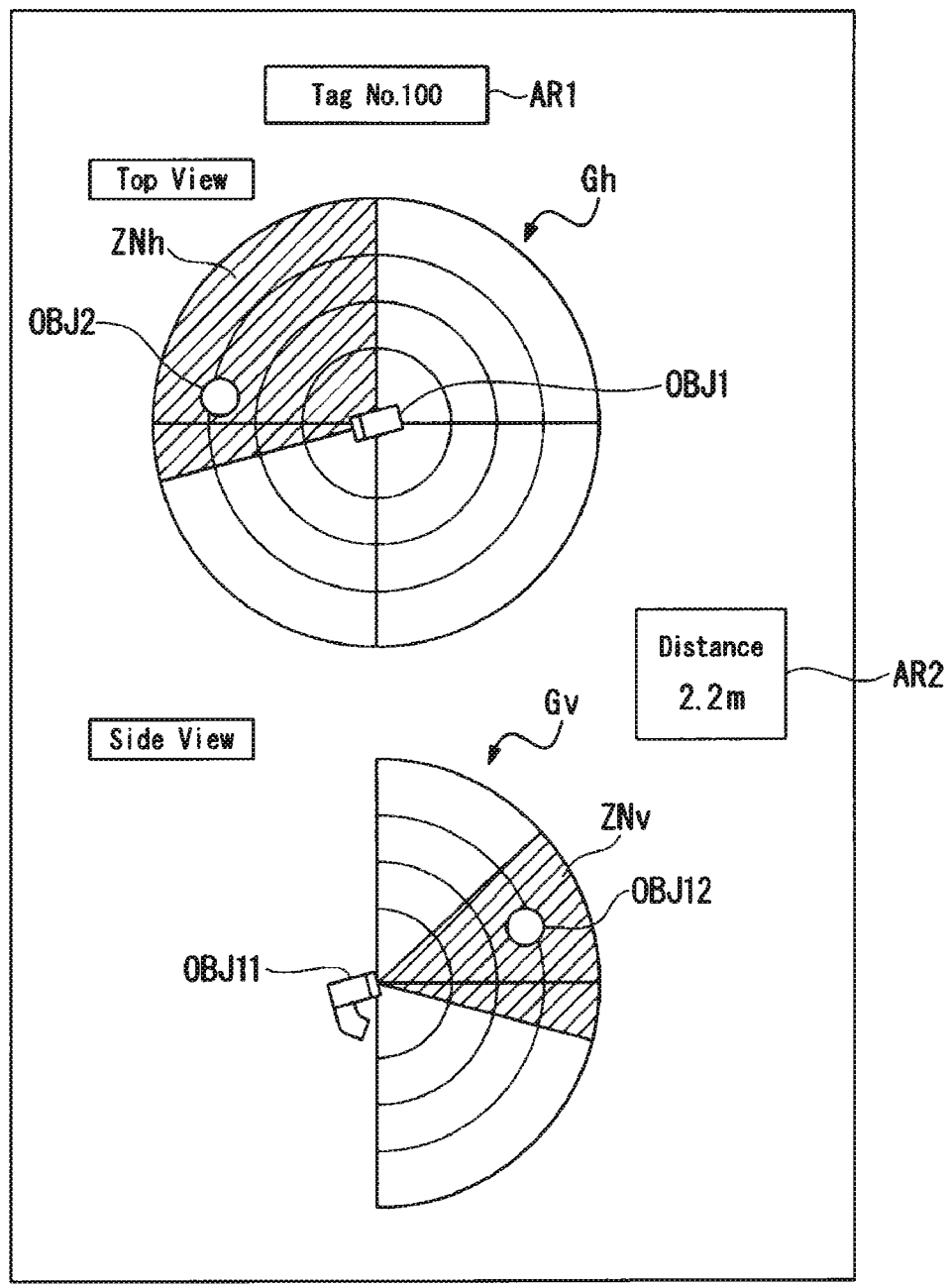
FIG. 5 is a diagram illustrating an example of a mode of a tag location indication screen according to the present embodiment.

The portable terminal device 200 outputs the tag location detected as described above in a display. FIG. 5 illustrates an example of a mode of a tag location indication screen that is displayed at the display unit 205 of the portable terminal device 200. The tag location indication screen is a screen that shows a detected location of the RFID tag 300.

A tag name area AR1 is disposed in the tag location indication screen of FIG. 5. In the tag name area AR1, information corresponding to a name of the RFID tag 300 that is the target of location detection is displayed. FIG. 5 shows an example in which a serial number assigned to the tag is displayed in the tag name area AR1.

A horizontal direction tag location indication image Gh and a vertical direction tag location indication image Gv are disposed in the tag location indication screen. The horizontal direction tag location indication image Gh is an image showing a tag location detected in the horizontal direction. The vertical direction tag location indication image Gv is an image showing a tag location detected in the vertical direction.

In the horizontal direction tag location indication image Gh, a circular plan view over 360° corresponding to the horizontal direction (plan view direction) is disposed to serve as a background. Thereon, an antenna object OBJ1 representing the antenna 101 of the tag reader 100 is disposed at the center of the circular plan view. The antenna object OBJ1 turns at the center of the circular plan view so as to show the current antenna orientation direction in the horizontal direction. A search range image ZNh in a fan shape is superposed on the circular plan view of the horizontal direction tag location indication image Gh. The search range image ZNh represents an angular range through which the antenna orientation direction of the antenna 101 has been moved in the horizontal direction for tag location detection by the tag reader 100. A tag object OBJ2 is disposed on the circular plan view of the horizontal direction tag location indication image Gh. The tag object OBJ2 is an image disposed on the circular plan view so as to indicate a tag location detected in the horizontal direction.

Figure 6A:
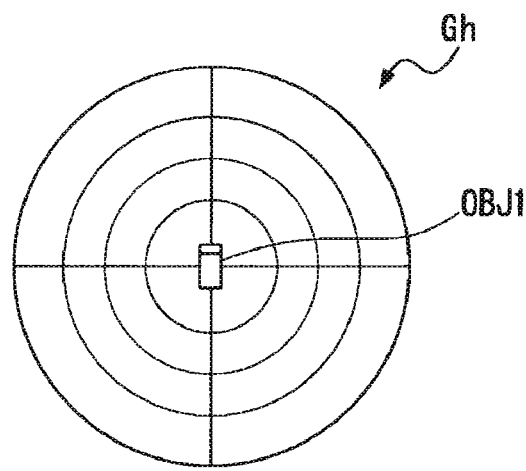
FIG. 6A, FIG. 6B and FIG. 6C are diagrams illustrating an example of display progress of a horizontal direction tag location indication image according to the present embodiment.
Figure 6B:
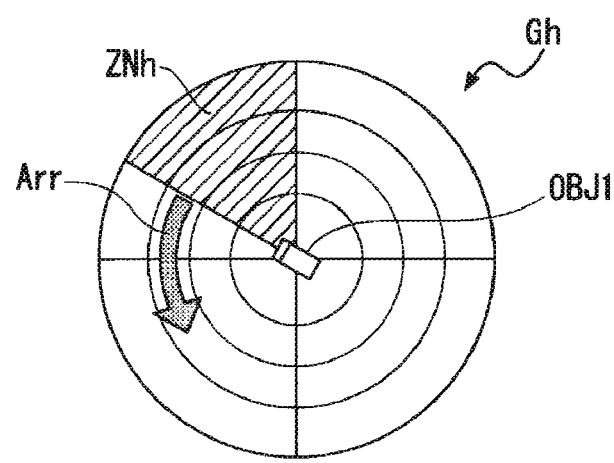
Figure 6C:
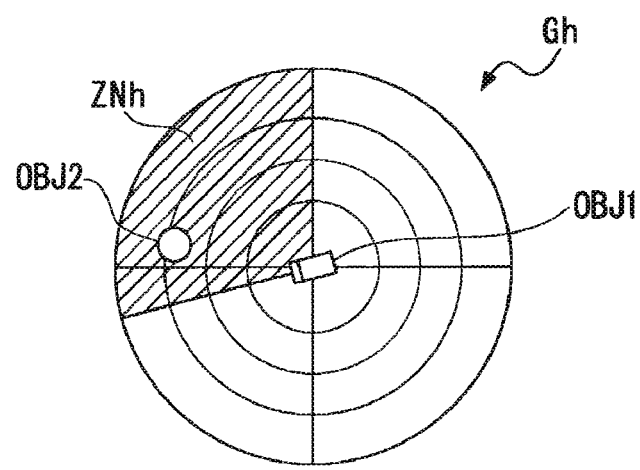

FIG. 6A to FIG. 6C illustrate an example of progress from when a user starts movement of the tag reader 100 (that is, movement of the antenna 101) until the horizontal direction tag location indication image Gh is shown in FIG. 5. Before the user starts the movement of the tag reader 100, first, the user holds the tag reader 100 in a stationary state for a certain duration (for example, around 5 s). When the portable terminal device 200 detects this state in which the tag reader 100 is stationary for the certain duration, the portable terminal device 200 sets the state at this time as an initial state. In the initial state, the horizontal direction tag location indication image Gh is displayed in the mode illustrated in FIG. 6A. That is, the antenna object OBJ is displayed on the horizontal direction tag location indication image Gh in a state of being oriented directly upward, which is a reference direction. In other words, the angle to which the antenna orientation direction is oriented that is detected in the initial state is set as the reference direction.

Now, an example is described in which the user starts a movement of the tag reader 100 so as to turn the antenna orientation direction leftward about their elbow from the initial state described above. In association with this movement of the tag reader 100, as shown in FIG. 6B, the antenna object OBJ changes direction so as to turn in the counterclockwise direction from the state of being oriented directly upward. As the antenna object OBJ1 turns as described above and the direction thereof is changed, the search range image ZNh is changed so as to expand in the counterclockwise direction from the reference direction. As depicted in FIG. 3, the phase of signals being received changes in accordance with the movement of the tag reader 100, that is, the movement of the antenna 101. The trend of changes of phase is identified as being positive or negative. On the basis of the trend of changes of phase, it is determined whether the movement direction of the antenna 101 is toward the location of the RFID tag 300 or away from the location of the RFID tag 300. On the basis of this determination result, a tag direction indication image Arr is also displayed on the horizontal direction tag location indication image Gh, in an arrow shape indicating a direction to the RFID tag 300. FIG. 6B shows an example in which the current movement of the antenna 101 is toward the RFID tag 300. Therefore, the tag direction indication image Arr is displayed pointing in the same direction as the direction in which the antenna object OBJ1 is turning. By observing this display, the user can understand that the RFID tag 300 is located at the direction in which the tag reader 100 is currently being moved. On the other hand, if the movement of the tag reader 100 is started so as to turn the antenna orientation direction rightward, opposite to the example in FIG. 6B, the trend of changes of phase is positive and it is determined that the antenna 101 is moving away from the RFID tag 300. In this case, the antenna object OBJ1 is displayed so as to turn in the clockwise direction, but the tag direction indication arrow Arr is displayed so as to point in the counterclockwise direction, opposite to the direction of turning of the antenna object OBJ1. By observing this display, the user can understand that the direction in which the tag reader 100 is currently being moved is not the direction toward where the RFID tag 300 is located.

In the process of the tag reader 100 being moved such that the antenna orientation direction turns further in the counterclockwise direction from FIG. 6B, a reversal of the trend of changes of phase occurs at a certain time. This is a state in which the antenna orientation direction in the horizontal direction corresponds with the location of the RFID tag 300 (a state in the movement path of the antenna 101 in the horizontal direction in which the distance between the RFID tag 300 and the antenna 101 is shortest). Accordingly, the portable terminal device 200 detects the location (distance and bearing) in the horizontal direction as described above. Then, in accordance with the detected bearing and distance, the portable terminal device 200 displays the tag object OBJ2 on the circular plan view as illustrated in FIG. 6C. If, for example, the antenna orientation direction is subsequently turned further leftward, the display progresses as shown in FIG. 6C. That is, the antenna object tag object OBJ2 continues to be displayed at the same position on the circular plan view, while the antenna object OBJ1 turns further in the counterclockwise direction in accordance with the movement of the antenna orientation direction, and the search range image ZNh expands further in the counterclockwise direction. If the user then changes the direction of movement of the antenna 101 to the clockwise direction from the direction of the antenna object OBJ1 shown in FIG. 6C, the antenna object OBJ1 also turns in the clockwise direction, tracking the direction of movement of the antenna 101. However, the search range image ZNh stays in the state shown in FIG. 6C rather than tracking the movement of the antenna 101 in the clockwise direction. That is, the search range image ZNh shows the maximum range that has been searched from the start of the movement of the antenna 101 to the present moment.

Description now returns to FIG. 5. In the vertical direction tag location indication image Gv, a semicircular plan view over 180° corresponding to the vertical direction (side view direction) is disposed to serve as the background. Thereon, an antenna object OBJ11 representing the antenna 101 of the tag reader 100 is disposed at the center of the semicircle of the semicircular plan view. The antenna object OBJ11 turns at the center of the semicircle of the semicircular plan view so as to show the current angle of the antenna orientation direction in the vertical direction. A search range image ZNv in a fan shape is superposed on the semicircular plan view of the vertical direction tag location indication image Gv. The search range image ZNv represents an angular range through which the antenna orientation direction of the antenna 101 has been moved in the vertical direction for tag location detection. A tag object OBJ12 is disposed on the semicircular plan view of the vertical direction tag location indication image Gv. The tag object OBJ12 is an image disposed on the semicircular plan view so as to indicate a tag location detected in the vertical direction.

The vertical direction tag location indication image Gv is displayed in a procedure corresponding to the description of FIG. 6A to FIG. 6C. That is, an up-down angle detected when movement is started serves as a reference direction in the vertical direction. In accordance with movement of the antenna 101 in the vertical direction, the antenna object OBJ11 turns on the semicircular plan view, the search range image ZNv expands, and a tag direction indication image Arr is displayed. When a state in which the antenna orientation direction corresponds with the tag location is reached (a state in the movement path of the antenna 101 in the vertical direction in which the distance between the RFID tag 300 and the antenna 101 is shortest), the portable terminal device 200 detects the location (distance and bearing) of the RFID tag 300 in the vertical direction. Then, in accordance with the detected bearing and distance, the portable terminal device 200 disposes the tag object OBJ12 on the semicircular plan view.

A distance indication area AR2 is also disposed in the tag location indication screen. The distance indication area AR2 is an area that represents the current tag distance with a numerical value.

By observing the horizontal direction tag location indication image Gh and the vertical direction tag location indication image Gv in the tag location indication screen, the user may instinctively and accurately understand the location (bearing and distance) of the RFID tag 300 in a three-dimensional space. Furthermore, because a specific numerical value is displayed in the distance indication area AR2, the user may more precisely understand the distance of the location of the RFID tag 300 in the three-dimensional space. Subsequently, the user walks toward the RFID tag 300 and the phase changes. The distance $D_0$ decreases by a distance amount that is found by dividing a phase change amount by a and multiplying by the wavelength λ. Accordingly, the numerical value of distance displayed in the distance indication area AR2 may be displayed so as to decrease in accordance with movement of the user.

Figure 7:
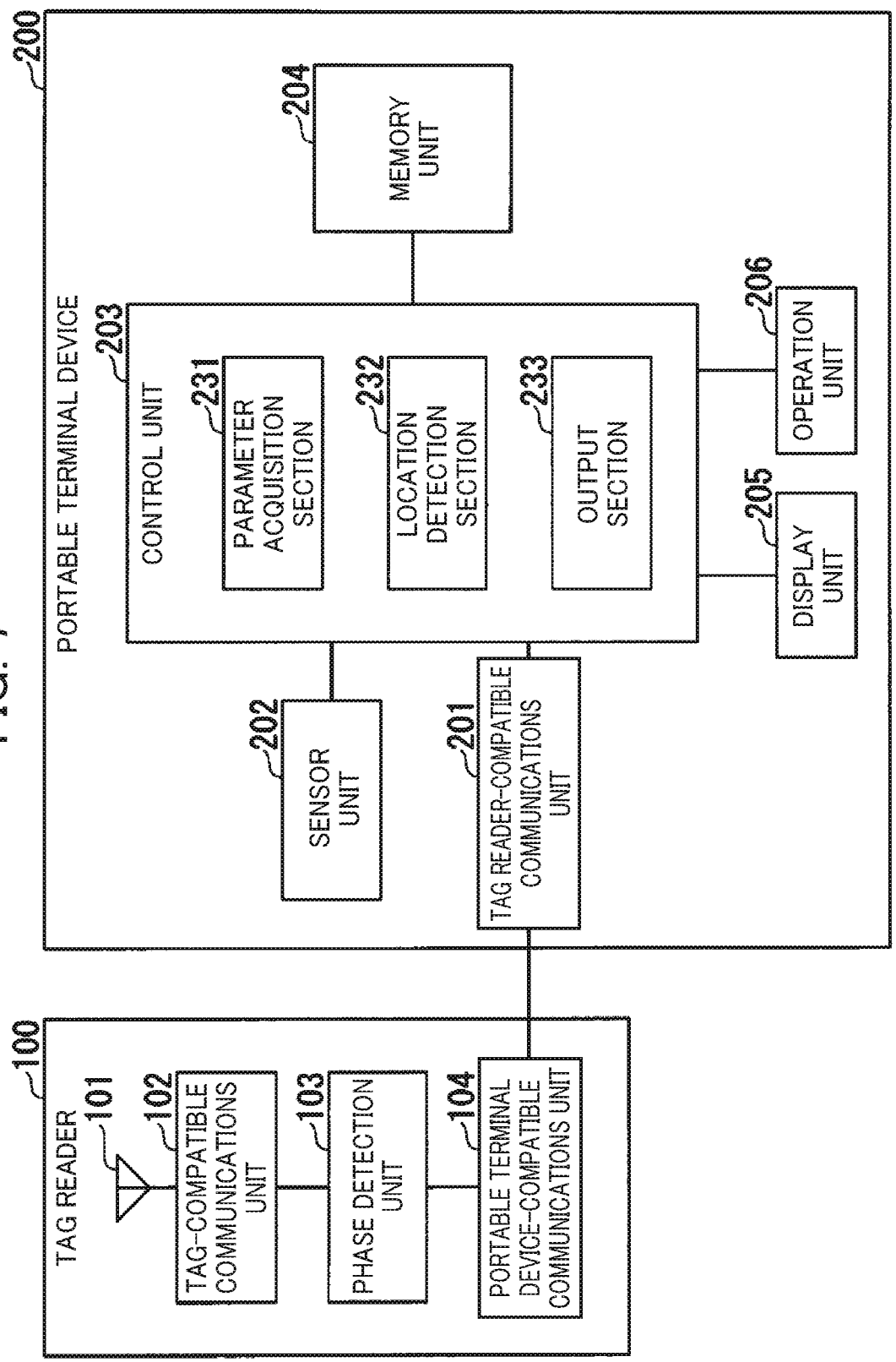
FIG. 7 is a diagram illustrating an example of configuration of the tag reader and a portable terminal device according to the present embodiment.

FIG. 7 illustrates an example of configuration of the tag reader 100 and portable terminal device 200 according to the present embodiment. First, structures of the tag reader 100 are described with reference to FIG. 7. The tag reader 100 is equipped with the antenna 101, a tag-compatible communications unit 102, a phase detection unit 103 and a portable terminal device-compatible communications unit 104. The antenna 101 transmits and receives electromagnetic waves to and from the RFID tag 300 (FIG. 1). The tag-compatible communications unit 102 communicates with the RFID tag 300 by wireless using electromagnetic waves with a predetermined wavelength. As mentioned above, the tag-compatible communications unit 102 according to the present embodiment may communicate using a predetermined wavelength in the UHF band. The phase detection unit 103 detects the phases of signals received from the RFID tag 300. The portable terminal device-compatible communications unit 104 communicates with the portable terminal device 200. A communications system of the portable terminal device-compatible communications unit 104 with the portable terminal device 200 is not particularly limited, but the following examples may be mentioned. If communicating by wire, the portable terminal device-compatible communications unit 104 may communicate by, for example, USB (Universal Serial Bus (registered trademark)), a wired local area network (LAN) or the like. If communicating by wireless, the portable terminal device-compatible communications unit 104 may communicate by Bluetooth (registered trademark), a wireless LAN or the like. With regard to ease of handling for users, wireless communication is preferable. In the present embodiment, the portable terminal device-compatible communications unit 104 transmits phase information representing phases detected by the phase detection unit 103 to the portable terminal device 200.

Now, structures of the portable terminal device 200 are described with reference to FIG. 7. The portable terminal device 200 is equipped with a tag reader-compatible communications unit 201, a sensor unit 202, a control unit 203, a memory unit 204, the display unit 205, and an operation unit 206. The tag reader-compatible communications unit 201 communicates with the tag reader 100. The communication system of the tag reader-compatible communications unit 201 corresponds with the communication system of the portable terminal device-compatible communications unit 104. The sensor unit 202 is a section containing one or more sensors to be used in tag location detection. Corresponding with the descriptions above, the sensor unit 202 can include a magnetism sensor, an acceleration sensor, an angular acceleration sensor and suchlike.

The control unit 203 performs control relating to tag location detection and outputs of detection results at the portable terminal device 200. Functions of the control unit 203 are realized by a CPU (central processing unit) provided at the portable terminal device 200 executing a program. The control unit 203 provides functional sections of a parameter acquisition section 231, a location detection section 232 and an output section 233.

As a distance detection parameter to be used in detecting the tag distance $D_0$ (an example of a storage medium distance) from position $P_0$ to the RFID tag 300, the parameter acquisition section 231 acquires a predetermined value set in accordance with a positional relationship between position $P_0$ (an example of a first position) and position $P_1$ (an example of a second position) that is a different position of the antenna. In the case of the method described with FIG. 2, the distance detection parameter is a reader movement speed v to be used in calculating the distance b between position $P_0$ and position $P_1$. The parameter acquisition section 231 may acquire a value of the distance b that is stored in the memory unit 204 as a fixed value, as mentioned above. Alternatively, the parameter acquisition section 231 may calculate a movement amount from position $P_1$ to position $P_0$ on the basis of detection outputs of an acceleration sensor provided at the sensor unit 202 and acquire the calculated movement amount to serve as the distance b. In the case of the method described with FIG. 4, the distance detection parameter is the radius r of the circumference on which position $P_0$ and position $P_1$ are disposed. In this case, the parameter acquisition section 231 may acquire a predetermined value stored in the memory unit 204 as the radius r, which is a fixed value or is set in accordance with the length from the elbow of the user, as described above. The parameter acquisition section 231 may calculate the central angle θ using angles of position $P_1$ and position $P_0$ that are detected by a direction sensor provided at the sensor unit 202, as described above.

The location detection section 232 detects the storage medium distance (the tag distance $D_0$) using a phase $\Phi_0$ detected by the phase detection unit 103 at position $P_0$ (an example of a first phase), a phase $\Phi_1$ detected by the phase detection unit 103 at position $P_1$ (an example of a second phase), and the distance detection parameter acquired by the parameter acquisition section 231. That is, in the case of the method described with FIG. 2, the location detection section 232 calculates the tag distance $D_0$ from Equation 5, using the value of the distance b that is acquired to be the distance detection parameter by the parameter acquisition section 231. In the case of the method described with FIG. 4, the location detection section 232 calculates the tag distance $D_0$ from Equation 9, using the values of the central angle θ and the radius r that are acquired to be distance detection parameters by the parameter acquisition section 231.

As described with FIG. 3, the location detection section 232 detects the direction of the antenna 101 that is detected at the time at which position $P_0$ is identified as the bearing measured from position $P_0$ on which the RFID tag 300 is disposed (the storage medium bearing).

The output section 233 outputs the distance of the RFID tag 300 and bearing of the RFID tag 300 that have been calculated by the location detection section 232 in a display. That is, the output section 233 displays, for example, the tag location identification screen in accordance with the mode illustrated in FIG. 5 to FIG. 6C using the distance and bearing of the RFID tag 300 acquired by the location detection section 232.

The memory unit 204 stores various kinds of information to be used by the control unit 203. As described above, the memory unit 204 may store a tag movement speed v, radius r or the like set as a constant to be a distance detection parameter.

The display unit 205 is a section that displays images in accordance with control by the control unit 203. The operation unit 206 displays operation elements (keys, buttons and the like) integrally with an input device (for example, a touch panel or the like) with which the portable terminal device 200 is equipped. The control unit 203 executes processes in accordance with operations performed on the operation elements, input device and the like included in the operation unit 206.

Figure 8:
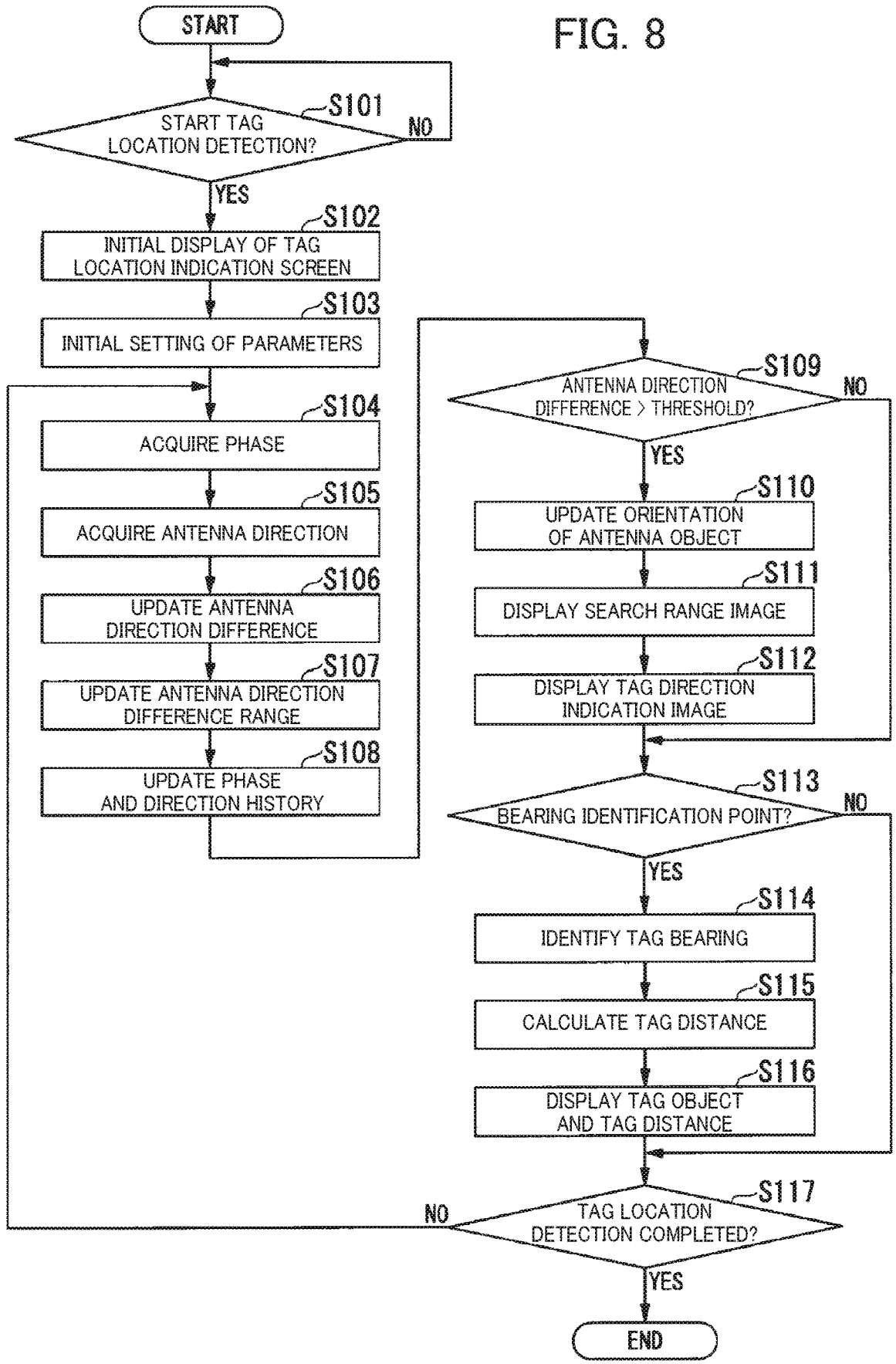
FIG. 8 is a flowchart illustrating a processing sequence example that is executed by the portable terminal device according to the present embodiment in order to detect a tag location and output a display of the detected tag location.

Now, an example of a processing sequence that the portable terminal device 200 according to the present embodiment executes in order to detect a tag location and output a display of the detected tag location is described with reference to the flowchart in FIG. 8. The control unit 203 of the portable terminal device 200 waits ("NO" in step S101) until a time at which detection of a tag location is to be started. As described above, when a user starts detection of a tag location, the user holds the tag reader 100 to which the portable terminal device 200 is fixed in their hand, as illustrated in FIG. 1, and keeps the tag reader 100 in a stationary state for a predetermined duration (for example, around 5 s). When the portable terminal device 200 determines that the stationary state has continued for the predetermined duration, for example, on the basis of detection outputs from an acceleration sensor provided at the sensor unit 202, the portable terminal device 200 determines that this is a time to start detection of a tag location ("YES" in step S101).

In response to the time to start detection of the tag location, the output section 233 shows an initial display of the tag location indication screen (step S102). In the initial state of the tag location indication screen, the antenna object OBJ1 is disposed on the horizontal direction tag location indication image Gh in the state of being oriented directly upward, which is the reference direction. The search range image ZNh is not yet displayed; the tag object OBJ2 is also not yet displayed. Similarly, in the initial state of the tag location indication screen, the antenna object OBJ11 is disposed on the vertical direction tag location indication image Gv in a state of being oriented horizontally (straight across), which is the reference direction. The search range image ZNv is not yet displayed; the tag object OBJ12 is also not yet displayed. No meaningful value representing distance is displayed in the distance indication area AR2.

In addition, in response to the time to start detection of the tag location, the parameter acquisition section 231 of the control unit 203 initializes settings of parameters to be used in the tag location detection and the display of the tag location indication screen (step S103). More specifically, in step S103 the parameter acquisition section 231 initializes parameters of an initial antenna direction (initial_direction), an antenna direction difference (direction_diff), a maximum antenna direction difference (direction_diff_max), and a phase and direction history (list_phase_time). The initial antenna direction is a parameter representing the antenna direction in the initial state. The initial antenna direction includes an antenna horizontal angle and an antenna vertical angle. The initial antenna direction is expressed, for example, as follows.

intial_direction=[Azimuth],[Pitch]

The horizontal angle and vertical angle of the antenna direction at the time of starting location detection are assigned to the antenna horizontal angle ([Azimuth]) and the antenna vertical angle ([Pitch]), respectively. The horizontal angle and vertical angle of the antenna direction may be, for example, calculated by the parameter acquisition section 231 using a direction indicated by a sensor provided at the sensor unit 202.

The antenna direction difference is a parameter representing differences between a current antenna horizontal angle and antenna vertical angle and the initial antenna direction. Respective values of the antenna horizontal angle and antenna vertical angle in the antenna direction difference are assigned initial values of 0. Thus, the initial value of the antenna direction difference is expressed, for example, as follows.

direction_diff=[0,0]

An antenna direction difference range is a parameter representing ranges of differences in the antenna horizontal angle and the antenna vertical angle that have been detected from the start of location detection to a present time. The range is expressed by two angle differences, minimum and maximum, relative to the angle represented by the initial antenna direction. Therefore, the antenna direction difference range includes two angle values representing a range corresponding to antenna horizontal angles and two angle values representing a range corresponding to antenna vertical angles. In the initial state, all angle values of the antenna direction difference range are 0. Thus, the initial value of the antenna direction difference range is expressed, for example, as follows.

direction_diff_max=[0,0,0,0]

The phase and direction history is a parameter representing phases and antenna directions detected from the start of location detection to a current time. The phase and direction history represents phases (phase) and antenna directions (antenna horizontal angle (Azimuth) and antenna vertical angle (Pitch)) detected at respective times (time). In the initial state, no meaningful values have been acquired for any of the time, phase and antenna direction. Thus, the initial value of the phase and direction history is expressed, for example, as follows.

list_phase_time<time,phase,Azimuth,Pitch>=null

After the initial display of the tag location indication screen (step S102) and the initial setting of the parameters (step S103) as described above, for example, a processing loop is executed at a constant time interval until tag location detection is completed, to detect the tag location and display the tag location indication screen in order to present detection results. In the loop processing, first, the parameter acquisition section 231 acquires a phase for a current time (step S104). The tag reader 100 sends phase information representing the phase detected by the phase detection unit 103. As the processing of step S104, the parameter acquisition section 231 acquires a phase represented by the phase information received from the tag reader 100. The parameter acquisition section 231 also acquires the antenna direction at the current time (step S105). The parameter acquisition section 231 inputs the horizontal angle and vertical angle detected by the sensor unit 202 at the current time. The parameter acquisition section 231 uses the inputted horizontal angle to calculate the antenna horizontal angle, and uses the inputted vertical angle to calculate the antenna vertical angle. Thus, the parameter acquisition section 231 acquires the antenna direction by calculating the antenna horizontal angle and the antenna vertical angle.

Then, the parameter acquisition section 231 uses the antenna direction acquired in step S105 and the initial antenna direction set in step S103 to update the antenna direction difference parameter (step S106).

The parameter acquisition section 231 also uses the antenna direction acquired in step S105 and the initial antenna direction set in step S103 to update the antenna direction difference range parameter (step S107). If either of the antenna horizontal angle and the antenna vertical angle as the antenna directions acquired in step S105 is within the preceding antenna direction difference range, there is no need to update the antenna direction difference range in step S107.

The parameter acquisition section 231 updates the phase and direction history parameter (step S108). This processing to update the phase and direction history appends the phase acquired in the most recent step S104 and the antenna direction acquired in step S105 to the phase and direction history in association with the current time.

Then, the output section 233 makes a determination as to whether the antenna direction difference updated in step S106 exceeds a pre-specified threshold (step S109). The determination in step S109 is applied to the difference value of each of the antenna horizontal angle and the antenna vertical angle of the antenna direction difference. The threshold may be set in consideration of the smallest angle that can be visually discerned in changes of direction of the antenna objects OBJ1 and OBJ11 and in changes in display of the search range images. The threshold may also be set in consideration of the smallest angle provided in the history of phases that can identify whether the antenna 101 is moving toward or away from the RFID tag 300 according to a usual movement speed of the antenna 101. In specific terms, a value of around, for example, 10% of the angular range can be considered for the threshold. For the antenna horizontal angle, because the angular range is 360°, the threshold may be set to, for example, 36°. For the antenna vertical angle, because the angular range is 180°, the threshold may be set to, for example, 18°.

If the difference in either of the antenna horizontal angle of the antenna direction difference and the antenna vertical angle of the antenna direction difference exceeds the threshold, ("YES" in step S109), the output section 233 updates the orientation of the antenna object OBJ1 or OBJ11 in the tag location indication screen (step S110) on the basis of the antenna direction difference updated in step S106. The output section 233 updates the orientation of antenna object OBJ1 on the basis of the difference in the antenna horizontal angle represented by the antenna direction difference. The output section 233 also updates the orientation of antenna object OBJ11 on the basis of the difference in the antenna vertical angle represented by the antenna direction difference.

On the basis of the antenna direction difference range updated in step S107, the output section 233 displays one or both of the search range image ZNh and the search range image ZNv (step S111). That is, if the difference in the antenna horizontal angle of the antenna direction difference has been determined to exceed the threshold in step S109, the search range image ZNh is displayed in step S111 so as to show the range according to the two difference values in the antenna horizontal angle of the antenna direction difference range. If the difference in the antenna vertical angle of the antenna direction difference has been determined to exceed the threshold in step S109, the search range image ZNv is displayed in step S111 so as to show the range according to the two difference values in the antenna vertical angle of the antenna direction difference range.

The output section 233 also displays the tag direction indication images Arr (step S112). If the difference in the antenna horizontal angle of the antenna direction difference has been determined to exceed the threshold in step S109, in step S112 the output section 233 displays the tag direction indication image Arr on the horizontal direction tag location indication image Gh. When the tag direction indication image Arr is to be displayed on the horizontal direction tag location indication image Gh, the output section 233 identifies the movement direction of the antenna 101 in the horizontal direction on the basis of the history of the antenna horizontal angle represented in the phase and direction history updated in step S108. The output section 233 makes a determination as to whether the current movement direction of the antenna 101 corresponds to movement toward or away from the RFID tag 300 by identifying whether the trend according to changes in phase represented in the phase and direction history updated in step S108 is positive or negative. If it is determined that the movement is toward the RFID tag 300, the output section 234 displays the tag direction indication image Arr on the horizontal direction tag location indication image Gh so as to point in the same direction as the identified movement direction of the antenna 101. On the other hand, if it is determined that the movement is away from the RFID tag 300, the output section 234 displays the tag direction indication image Arr on the horizontal direction tag location indication image Gh so as to point in the opposite direction to the current movement direction of the antenna 101. If the difference in the antenna vertical angle of the antenna direction difference has been determined to exceed the threshold in the determination of step S109, in step S112 the output section 233 displays the tag direction indication image Arr on the vertical direction tag location indication image Gv in a similar manner.

If neither the antenna horizontal angle difference nor the antenna vertical angle difference of the antenna direction difference exceeds the threshold ("NO" in step S109), the processing of steps S110 to S112 is skipped.

Next, the location detection section 232 refers to the history of phases in the phase and direction history and makes a determination as to whether a bearing identification point has been reached (step S113). This bearing identification point is the point in time at which the trend of changes of phase reverses in association with the minimum in the distance from the antenna 101 to the RFID tag 300, as illustrated by time t0 in FIG. 3.

If the bearing identification point has been reached ("YES" in step S113), the location detection section 232 identifies (detects) the bearing (tag bearing) of the RFID tag 300 (step S114). The location detection section 232 acquires the antenna direction at the time of the bearing identification point reached in step S113 from the phase and direction history. This acquired antenna direction is, in other words, the tag bearing. The location detection section 232 makes a further determination as to whether the tag bearing identified at this time corresponds to the horizontal direction or the vertical direction. The location detection section 232 refers to the phase and direction history and, for example, compares a change amount in the antenna horizontal angle with a change amount in the antenna vertical angle over a certain duration before and after the bearing identification point. If the result of the comparison is that the change amount in the antenna horizontal angle is larger, the identified tag bearing corresponds to the horizontal direction, and if the result of the comparison is that the change amount in the antenna vertical angle is larger, the identified tag bearing corresponds to the vertical direction.

The position of the antenna 101 at the time at which the bearing of the RFID tag 300 is identified in step S114 corresponds to position $P_0$ shown in FIG. 2 or FIG. 4. That is, position $P_0$ is identified in association with the bearing of the RFID tag 300 identified in step S114. If the bearing of the RFID tag 300 in the horizontal direction is identified by step S114, position $P_0$ in the horizontal direction is identified, and if the bearing of the RFID tag 300 in the vertical direction is identified, position $P_0$ in the vertical direction is identified.

Hence, the location detection section 232 calculates (detects) the tag distance $D_0$ (step S115) on the basis of the position $P_0$ that is identified. Here, if the position $P_0$ in the horizontal direction has been identified in step S114, the location detection section 232 calculates the tag distance $D_0$ in the horizontal direction, and if the position $P_0$ in the vertical direction has been identified in step S114, the location detection section 232 calculates the tag distance $D_0$ in the vertical direction. In the case of the method of FIG. 2, the location detection section 232 calculates the tag distance $D_0$ by Equation 5, and in the case of the method of FIG. 4, the location detection section 232 calculates the tag distance $D_0$ by Equation 9. If the tag distance is to be calculated by Equation 5 in accordance with the method of FIG. 2, in step S115 the parameter acquisition section 231 acquires the distance b in accordance with the mode described above. The location detection section 232 uses the acquired distance b to calculate the tag distance $D_0$ with Equation 5. Alternatively, if the tag distance is to be calculated by Equation 9 in accordance with the method of FIG. 4, in step S115 the parameter acquisition section 231 acquires the radius r and central angle θ in accordance with the mode described above. The location detection section 232 uses the acquired radius r and central angle θ to calculate the tag distance $D_0$ with Equation 9.

Next, in accordance with the tag bearing identified in step S114 and the distance calculated in step S115, the output section 233 displays the tag object and displays the tag distance in the distance indication area AR2 (step S116). If this is the first detection of the tag position in step S116 since the start of detection, the display of the tag object OBJ2 or tag object OBJ12 corresponding to the bearing identification point identified in step S113 is started in the tag location indication image (the horizontal direction tag location indication image Gh or the vertical direction tag location indication image Gv) corresponding to a plane direction (the horizontal direction or the vertical direction), and the display of a numerical value representing distance is started in the distance indication area AR2.

Alternatively, if this is the second or subsequent detection of the tag position in step S116 since the start of detection, the display of the tag object corresponding to the bearing identification point identified in step S113 is updated in the tag location indication image corresponding to the plane direction (the horizontal direction or the vertical direction). The tag object is updated in accordance with the tag bearing identified in step S114 and the distance calculated in step S115.

The tag distance that is calculated in step S115 the first time since the start of the detection of the tag location is found in correspondence with only one plane direction of the horizontal direction and the vertical direction. Thereafter, the tag distance corresponding to the other plane direction is calculated by the loop processing of steps S104 to S117 being repeated. Because the tag distance that has been calculated at this stage is calculated using the distance $D_1$ along the tag bearing that has already been determined in correspondence with the one plane direction, the tag distance has high accuracy with respect to the actual location of the RFID tag 300. Therefore, when the output section 234 displays the tag distance found in correspondence with only one plane direction in the distance indication area AR2 for the first time after the start of location detection, an indication may be disposed at the distance indication area AR2 to indicate that the accuracy of the displayed distance may be lower than the accuracy of the tag distance that is to be calculated in correspondence with both the plane directions.

After the processing of step S116, or if it is determined that no bearing identification point has been reached ("NO" in step S113), the location detection section 232 makes a determination as to whether the tag location detection has been completed (step S117). If it is determined that the tag location detection has not been completed ("NO" in step S117), the processing returns to step S104. On the other hand, if it is determined that the tag location detection has been completed ("YES" in step S117), for example, due to an operation commanding the end of tag location detection being performed or suchlike, the location detection processing is ended.

Incidentally, if the tag distance $D_0$ is calculated by the method of FIG. 2, the mode of acquiring the distance b is not limited by the example described above. For example, the tag reader 100 may be moved by an automatic guided vehicle (AGV) that is equipped with an encoder and the distance b may be calculated on the basis of detection outputs of the encoder. As a further example, the portable terminal device 200 may input images captured in an imaging direction that matches the antenna direction. The portable terminal device 200 may then carry out image processing to calculate a movement amount from changes in the inputted images associated with movements of the tag reader 100 and acquire the calculated movement amount as the distance b. A configuration is also possible in which the tag reader 100 is provided with two of the antenna 101, which are separated by a distance b that has been set as a fixed value in advance, and the tag distance $D_0$ is calculated using phases of signals received by each of the two antennas 101. In this case too, the distance b may be stored in the portable terminal device 200 as a fixed value.

FIG. 1 shows structures of a tag location detection system according to a mode in which the portable terminal device 200 is fixed to the tag reader 100 by the adapter ADP. However, a configuration is possible in which the functions of the portable terminal device 200 are added to the tag reader 100 and the portable terminal device 200 is integrated with the tag reader 100.

In the descriptions above, the tag location is detected for each of the horizontal direction and the vertical direction. However, a configuration is possible in which the tag location is detected in one or other of the horizontal direction and the vertical direction. Even if the tag location is detected for only one plane direction, the tag location may be detected using a single frequency with high accuracy, compared to, for example, a case in which plural signals with different frequencies are employed as in Patent Document 2.

In the descriptions above, the distance to the RFID tag 300 and the bearing of the RFID tag 300 are detected to serve as the tag location. However, a configuration is possible in which the distance to the RFID tag 300 is detected as the tag location and the bearing of the RFID tag 300 is not detected. Conversely, a configuration is possible in which the bearing of the RFID tag 300 is detected as the tag location and the distance to the RFID tag 300 is not detected.

In the descriptions above, the tag location is displayed at the display unit 205. However, a configuration is possible in which information relating to the location of the RFID tag 300, such as whether a movement is toward or away from the RFID tag 300 and the like, is reported to a user by sounds or the like.

A configuration is possible in which the tag reader 100 is incorporated in an autonomous device such as a drone or the like and the location of the RFID tag 300 is identified on the basis of phases detected by the tag reader 100 while the autonomous device is moving. In this case, the tag reader 100 may have, for example, a shape that is suitable for incorporation in the autonomous device; a configuration is possible in which, for example, sections corresponding to the antenna and the reader are physically separated.

An example is given in the above descriptions in which the antenna 101 is moved. However, even if the antenna 101 is fixed at a predetermined location and the RFID tag 300 is moved by a conveyor belt or the like, the location of the RFID tag 300 may be identified by a method similar to the methods described above.

An example is given in the above descriptions in which the location of the single RFID tag 300 is detected. However, using a similar method to the method described above, the locations of a plural number of the RFID tag 300 in a three-dimensional space may be identified simultaneously or successively, and the identified locations of the plural RFID tags 300 may be displayed on a map of the three-dimensional space as illustrated.

The tag reader 100, portable terminal device 200 and the like according to the embodiment described above may be realized by a computer. In this case, a program for realizing the functions of the embodiment may be recorded in a computer-readable recording medium; the program recorded in the recording medium may be read into a computer system and executed to realize the functions. The term "computer system" used herein is intended to include an operating system, hardware such as peripheral devices and so forth. The term "computer-readable recording medium" used herein is intended to include a portable medium such as a flexible disc, a magneto-optical disc, a ROM, a CD-ROM or the like, and to include a recording device such as a hard disc incorporated in the computer system or the like. The term "computer-readable recording medium" is also intended to include a medium that dynamically stores the program for a short duration, such as communication lines along which the program is transmitted through a network such as the Internet or the like or a communications circuit such as a telephony circuit or the like, and, in such cases, a medium in which the program is stored for some time, such as volatile memory at a computer that is a server or a client. The above-mentioned program may be a program for realizing a subset of the functions described above. The functions described above may be realized by a combination with a program that is already recorded in a computer system, and the functions may be realized using a programmable logic device such as a field programmable gate array (FPGA) or the like.

EXPLANATION OF REFERENCE NUMERALS 100 tag reader
101 antenna
102 tag-compatible communications unit
103 phase detection unit
104 portable terminal device-compatible communications unit
111 grip portion
200 portable terminal device
201 tag reader-compatible communications unit
202 sensor unit
203 control unit
204 memory unit
205 display unit
206 operation unit
231 parameter acquisition section
232 location detection section
233 output section
234 output section
300 RFID tag

The invention claimed is:

1. A method for measuring a distance with a portable tag reader which includes an antenna configured to receive signals from an object and a phase detector configured to detect phases of the received signals, the method comprising the steps of:
the tag reader being moved through swinging by a user;
receiving signals at least at a first location and a second location differing from each other when the tag reader is moved through swinging by the user;
detecting a first phase and a second phase which correspond to phases of the signals received at the first location and the second location, respectively; and
calculating a distance from the tag reader to the object based upon a phase difference between the first phase and the second phase.

2. The method according to claim 1, wherein
a predetermined moving speed of the antenna when the tag reader is moved through swinging by the user is stored in advance,
the method is configured to:
determine a travelling length between the first location and the second location based upon the predetermined moving speed; and
calculate the distance from the tag reader to the object based upon the travelling length thus determined.

3. The method according to claim 1, wherein
a predetermined travelling length of the antenna when the tag reader is moved through swinging by the user is stored in advance,
the method is configured to calculate the distance from the tag reader to the object based upon the predetermined travelling length.

4. The method according to claim 1, wherein
the tag reader further includes a sensor, and
the method is configured to calculate a travelling length from the first location to the second location based upon a detection output from the sensor.

5. The method according to claim 4 wherein the sensor includes at least one of a magnetic sensor, an accelerometer and an angular accelerometer.

6. The method according to claim 1, further comprising another step of determining a direction of the object in the step of the tag reader being moved through swinging by the user,
the other step is configured to:
determine the object to exist in a first direction connecting a start point and an end point, when phase differences are in a monotonic increase from the start point to the end point of movement through swinging;
determine the object to exist in a second direction opposite to the first direction, when the phase differences are in a monotonic decrease; and
determine the object to exist on a line corresponding to a direction of an extreme value, when the extreme value exists between the start point and the end point.

7. A method for measuring a distance with a portable tag reader which includes an antenna configured to receive signals from an object and a phase detector configured to detect phases of the received signals, the method comprising the steps of:
the tag reader being moved through swinging by a user;
receiving signals at least at a plurality of locations differing from one another when the tag reader is moved through swinging;
detecting a plurality of phases, each of which corresponds to a phase of a signal received at each of the plurality of locations;
determining the object to exist in a first direction connecting a start point and an end point, when phase differences of the plurality of phases are in an monotonic increase from the start point to the end point of movement through swinging;
determining the object to exist in a second direction opposite to the first direction, when the phase differences are in a monotonic decrease; and
determining the object to exist on a line corresponding to a direction of an extreme value, when the extreme value exists between the start point and the end point.

8. The method according to claim 7, further comprising another step of calculating a distance from the tag reader to the object in a direction of the object thus determined.

9. The method according to claim 8, wherein
a predetermined moving speed of the antenna when the tag reader is moved through swinging by the user is stored in advance,
the method is configured to:
determine a travelling length between a first location and a second location based upon the predetermined moving speed; and
calculate the distance from the tag reader to the object based upon the travelling length thus determined.

10. The method according to claim 8, wherein
a predetermined travelling length of the antenna when the tag reader is moved through swinging by the user is stored in advance, and
the method is configured to calculate the distance from the tag reader to the object based upon the predetermined travelling length.

11. The method according to claim 8, wherein
the tag reader further includes a sensor, and the method is configured to calculate a travelling length from a first location to a second location based upon a detection output from the sensor.

12. The method according to claim 11 wherein the sensor includes at least one of a magnetic sensor, an accelerometer and an angular accelerometer.

13. A storage medium location detection system comprising:
a tag reader which includes an antenna, a phase detector and a communication unit compatible with a portable terminal device, wherein
the tag reader is configured to be connected communicably to the portable terminal device through the communication unit,
the antenna is configured to receive signals from a storage medium at least at a first location and a second location differing from each other, when the tag reader is moved through swinging by a user;
the phase detector is configured to detect a first phase and a second phase which correspond to phases of signals received at the first location and the second location, respectively;
the communication unit is configured to transmit the first phase and the second phase thus detected to the portable terminal device; and
the portable terminal device is configured to calculate a distance from the tag reader to the storage medium based upon a phase difference between the first phase and the second phase.

14. The system according to claim 13, wherein
a predetermined moving speed of the antenna when the tag reader is moved through swinging by the user is stored in advance in the portable terminal device, and
the portable terminal device is configured to determine a travelling length from the first location to the second location based upon the predetermined moving speed and calculate the distance from the tag reader to the storage medium based upon the travelling length thus determined.

15. The system according to claim 13, wherein
a predetermined travelling length of the antenna when the tag reader is moved through swinging by the user is stored in advance in the portable terminal device, and
the portable terminal device is configured to calculate the distance from the tag reader to the storage medium based upon the predetermined travelling length.

16. The system according to claim 13 further comprising a sensor, wherein
the portable terminal device is configured to calculate a travelling length from the first location to the second location, upon receiving a signal of a detection output from the sensor.

17. The system according to claim 16 wherein the sensor includes at least one of a magnetic sensor, an accelerometer and an angular accelerometer.

18. The system according to claim 13, wherein
the portable terminal device is configured to:
determine the storage medium to exist in a first direction connecting a start point and an end point, when phase differences are in an monotonic increase from the start point to the end point of the tag reader being moved through swinging by the user;
determine the storage medium to exist in a second direction opposite to the first direction, when the phase differences are in a monotonic decrease; and
determine the storage medium to exist on a line corresponding to a direction of an extreme value, when the extreme value exists between the start point and the end point.

19. The system according to claim 13 wherein the portable terminal device includes a smart phone.

20. A storage medium location detection system comprising a tag reader which includes an antenna, a phase detector and a communication unit compatible with a portable terminal device, wherein
the tag reader is configured to be connected communicably to the portable terminal device through the communication unit,
the antenna is configured to receive signals from a storage medium at a plurality of locations differing from one another, when the tag reader is moved through swinging by a user,
the phase detector is configured to detect a plurality of phases, each of which corresponds to a phase of a signal received at each of the plurality of the locations,
the communication unit is configured to transmit the plurality of phases thus detected to the portable terminal device,
the portable terminal device is configured to:
determine the storage medium to exist in a first direction connecting a start point and an end point, when phase differences of the plurality of phases are in an monotonic increase from the start point to the end point of movement through swinging by the user,
determine the storage medium to exist in a second direction opposite to the first direction, when the phase differences are in a monotonic decrease, and
determine the storage medium to exist on a line corresponding to a direction of an extreme value, when the extreme value exists between the start point and the end point.

21. The system according to claim 20 wherein the portable terminal device is configured to calculate a distance from the tag reader to the storage medium in the direction of the storage medium thus determined.

22. The system according to claim 21, wherein
a predetermined moving speed of the antenna when the tag reader is moved through swinging by the user is stored in advance in the portable terminal device, and
the portable terminal device is configured to determine a travelling length from a first location to a second location based upon the predetermined moving speed and calculate the distance from the tag reader to the storage medium based upon the travelling length thus determined.

23. The system according to claim 21, wherein
a predetermined travelling length of the antenna when the tag reader is moved through swinging by the user is stored in advance in the portable terminal device, and
the portable terminal device is configured to calculate the distance from the tag reader to the storage medium based upon the predetermined travelling length.

24. The system according to claim 21 further comprises a sensor, wherein
the portable terminal device is configured to calculate a travelling length from a first location to the second location, upon receiving a signal of a detection output from the sensor.

25. The system according to claim 24 wherein the sensor includes at least one of a magnetic sensor, an accelerometer and an angular accelerometer.

26. The system according to claim 20 wherein the portable terminal device includes a smart phone.

27. A tag reader connected detachably to a portable terminal device including at least a display, the tag reader comprising:
an antenna;
a communication unit compatible with a storage medium; and
a phase detector, wherein
the communication unit is configured to communicate with the storage medium through the antenna,
the phase detector is configured to detect phases of signals received from the storage medium, and
the portable terminal device is configured to detect a minimum distance from the antenna to the storage medium based upon a distance detection parameter and the phases of signals and output detected results to the display of the portable terminal device such that the detected results are displayed.

28. The tag reader according to claim 27, wherein,
the portable terminal device further includes an accelerometer, and
the portable terminal device is configured to acquire a distance of the tag reader having moved from a first location to a second location based upon a detection output from the accelerometer.

29. A non-transitory computer readable medium comprising a computer program that controls a portable terminal device including at least a sensor and a display, the computer program, when executed by the portable terminal device, causing the portable terminal device to:
perform determination of timing whether to start detecting a location of an object according to a tag reader which is connected communicably to the portable terminal device and configured to read signals from the object;
perform an initial display of a screen for a location of the object based upon the determination;
acquire a plurality of phases of the signals read by the tag reader in response to the portable terminal device and the tag reader being moved through swinging by a user;
calculate information about a direction of the object and/or a distance of the object from the plurality of phases thus acquired; and
perform displaying on the display based upon the information about the direction and/or the distance of the object.

30. The computer readable medium according to claim 29, wherein the determination of timing is performed based upon a state in which the tag reader is at rest for a predetermined period of time.

31. The computer readable medium according to claim 29, wherein the sensor includes at least one of a magnetic sensor, an accelerometer and an angular accelerometer.

32. The computer readable medium according to claim 29, wherein
the computer program is configured to cause the portable terminal device to determine:
the object to exist in a first direction connecting a start point and an end point, when phase differences of the plurality of phases of the signals are in an monotonic increase from the start point to the end point of movement through swinging by the user,
the object to exist in a second direction opposite to the first direction, when the phase differences are in a monotonic decrease, and
the object to exist on a line corresponding to a direction of an extreme value, when the extreme value exists between the start point and the end point.

33. The computer readable medium according to claim 29, wherein the computer program is configured to cause the portable terminal device to calculate information about a distance of the object based upon phase differences of the plurality of phases of the signals.

* * * * *